United States Patent
Yamao et al.

(10) Patent No.: US 9,771,087 B2
(45) Date of Patent: Sep. 26, 2017

(54) ABNORMALITY DETECTION METHOD FOR VEHICLE BODY TILT CONTROL DEVICE

(71) Applicant: NIPPON STEEL & SUMITOMO METAL CORPORATION, Tokyo (JP)

(72) Inventors: Hitoshi Yamao, Amagasaki (JP); Daisuke Shinagawa, Osaka (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 15/026,262

(22) PCT Filed: Oct. 2, 2014

(86) PCT No.: PCT/JP2014/076467
§ 371 (c)(1),
(2) Date: Mar. 31, 2016

(87) PCT Pub. No.: WO2015/050233
PCT Pub. Date: Apr. 9, 2015

(65) Prior Publication Data
US 2016/0236696 A1    Aug. 18, 2016

(30) Foreign Application Priority Data

Oct. 4, 2013 (JP) ................................. 2013-208786

(51) Int. Cl.
*G06F 7/00* (2006.01)
*B61F 5/10* (2006.01)
(Continued)

(52) U.S. Cl.
CPC ............... *B61F 5/10* (2013.01); *B60G 99/00* (2013.01); *B60G 99/008* (2013.01); *B61F 5/22* (2013.01);
(Continued)

(58) Field of Classification Search
USPC ........................................................ 701/19
See application file for complete search history.

(56) References Cited

U.S. PATENT DOCUMENTS 6,397,129 B1 * 5/2002 Lanoix ..................... B61F 5/22
105/199.2
9,090,267 B2 * 7/2015 Shinmura ............... B61C 17/00
(Continued)

FOREIGN PATENT DOCUMENTS

| JP | 5038615 | 10/2012 | |
|---|---|---|---|
| JP | 5182239 | 4/2013 | |
| RU | 2578620 C1 * | 3/2016 | ............... B61F 5/10 |

*Primary Examiner* — Tyler Paige
(74) *Attorney, Agent, or Firm* — Clark & Brody

(57) ABSTRACT

An abnormality detection method for a vehicle body tilt control device makes it possible to determine which air spring has an air supply/exhaust abnormality. A model creation step prepares a state estimation model for each of the front and rear vehicle halves into which a vehicle is divided, and an abnormality detection step applies a state estimation technique to the state estimation model to detect which one of the air springs has an air supply/exhaust abnormality. When flow rate command values for air supplied to/exhausted from the air springs included in each vehicle half are input, each of the input flow rate command values for air supplied to/exhausted from the air springs is multiplied by a virtual gain and the results are averaged. Based on the averages, the average of the heights of the air springs is output, where each virtual gain is included as a state variable.

4 Claims, 8 Drawing Sheets

(51) Int. Cl.
  *B61F 5/22* (2006.01)
  *B60G 99/00* (2010.01)
  *B61F 99/00* (2006.01)
(52) U.S. Cl.
  CPC .......... *B61F 99/00* (2013.01); *B60G 2400/25* (2013.01); *B60G 2400/252* (2013.01)

(56) References Cited

U.S. PATENT DOCUMENTS

| | | | | |
|---|---|---|---|---|
| 2006/0162609 | A1* | 7/2006 | Weaver | E01B 25/08 104/124 |
| 2010/0204857 | A1* | 8/2010 | Forrest | B61L 27/0094 701/19 |
| 2011/0257900 | A1* | 10/2011 | Adams | G01M 17/04 702/33 |
| 2013/0319284 | A1* | 12/2013 | Shinmura | B61C 17/00 105/453 |
| 2015/0019071 | A1* | 1/2015 | Shimokawa | B61K 13/00 701/34.4 |

* cited by examiner

ABNORMALITY DETECTION METHOD FOR VEHICLE BODY TILT CONTROL DEVICE

TECHNICAL FIELD

The present invention relates to an abnormality detection method for a vehicle body tilt control device that tilts the vehicle body of a railroad vehicle.

BACKGROUND ART

Vehicle body tilt control devices are known that improve the ride comfort in a railroad vehicle traversing a track curve. A vehicle body tilt control device tilts the vehicle body by controlling the supply and/or exhaust of air to and from four air springs located between the vehicle body of a vehicle and a pair of bogies.

More specifically, when a vehicle is traversing a track curve, the vehicle body tilt control device supplies air to the air springs located above the outer rail to increase the height of these air springs and exhausts air from the air springs located above the inner rail to reduce the height of these air springs. This tilts the vehicle body toward the interior of the curve.

For example, Patent Document 1 (Japanese Patent No. 5182239) proposes a vehicle body tilt control device including air springs each having a spool-type flow proportional valve, a supply-side block valve (electromagnetic valve), and an exhaust-side block valve (electromagnetic valve). The spool-type flow proportional valve slides its spool and stops it at different positions to control the flow rate for air supplied to and exhausted from the associated air spring. The supply-side block valve is provided in the piping connecting the spool-type flow proportional valve to the air pressure source (i.e. source pressure reservoir) for controlling the supply of air to the spool-type flow proportional valve. The exhaust-side block valve is provided in the piping connecting the spool-type flow proportional valve to an exhaust port to control the exhaust of air from the spool-type flow proportional valve.

Of various abnormalities in supply and exhaust of air to and from air springs by the vehicle body tilt control device described in Patent Document 1, one particularly problematic one is the exhaust-side block valve remaining closed. As discussed above, when a vehicle is traversing a track curve, the vehicle body tilt control device supplies air to the air springs located above the outer rail to increase the height of these air springs to tilt the vehicle body. If the exhaust-side block valve remains closed, air in the air springs located above the outer rail cannot be exhausted therefrom, which means that the height of these air springs cannot return to its original level. As such, after the vehicle has finished traversing the track curve, the vehicle body cannot be returned to its horizontal position.

A method for detecting abnormalities in a vehicle body tilt control device is proposed by Patent Document 2 (Japanese Patent No. 5038615), for example. The method described in Patent Document 2 determines that there is an abnormality when the value of a predetermined equation represented by the heights of four air springs exceeds a predetermined threshold.

While the method described in Patent Document 2 is capable of determining that there is an abnormality in the vehicle body tilt control device, it cannot determine which one of the four air springs has an air supply/exhaust abnormality. As such, the vehicle body tilt control device must switch to the air supply/exhaust control using the differential pressure regulating valve or LV valve typically included in the device to return the vehicle body to its horizontal position. However, these valves typically have low flow rates such that the vehicle body can only return to its original position very slowly. Thus, passengers feel gravity in the left/right direction for a prolonged period of time, which significantly impairs ride comfort. Furthermore, since it cannot be determined which air spring has an air supply/exhaust abnormality, the work in repairs is complicated.

DISCLOSURE OF THE INVENTION

An object of the present invention is to provide an abnormality detection method that makes it possible to detect which air spring has an air supply/exhaust abnormality in a vehicle body tilt control device.

The present inventors did extensive research to achieve the above object. They turned their attention to the following approach. First, they created a vehicle body tilt movement model that models vehicle body tilt movements. A virtual gain is added to the vehicle body tilt movement model as a state variable to obtain a mathematic model. The virtual gain expresses an abnormality in supply/exhaust for each air spring for which detection is to be done. They considered to treat the mathematic model as a state estimation model. Then, they found out that applying a state estimation technique such as an extended Kalman filter to this state estimation model to estimate the virtual gain. They also found that it became possible to determine that there is an abnormality in the supply/exhaust for that air spring that corresponds to the virtual gain whose estimated value is below a predetermined threshold.

When there is an abnormality in the supply/exhaust for an air spring, the height (i.e. position in the up/down direction) of the vehicle body relative to the bogie can be affected more easily than the tilt of the vehicle body relative to the bogie, because the behavior of the vehicle body tilting relative to a bogie is affected by torsional moment acting on the vehicle body and is not independent from that relative to the other bogie, while the behavior of the vehicle body relative to a bogie in height is independent from that relative to the other bogie. In view of this, the present inventors found it advantageous if we use the flowing vehicle body tilt movement model to detect an abnormality in the supply/exhaust for each air spring. The vehicle body tilt movement model involves input and output for each of the front and rear vehicle halves into which the vehicle is divided (or for each bogie). The input is the average of the flow rate command values of supply/exhaust to/from the air springs located on the bogies (i.e. up/down commands for the vehicle). The output is the average of the heights of the air springs (i.e. the heights of the vehicle body from the bogie). Then, they found out the method in which the flow rate command values of supply/exhaust to/from the air springs in this vehicle body tilt movement model are multiplied by a virtual gain and the average of the flow rate command values of supply/exhaust to/from the air springs after the multiplication by the virtual gain is input to the vehicle body tilt movement model. Then, when the estimated value of one virtual gain is below a predetermined threshold, it can be determined that there is an abnormality in the supply/exhaust for the air spring corresponding to that virtual gain, that is, the flow rate command value of supply/exhaust multiplied by this virtual gain does not contribute much to the input to the vehicle body movement model.

The present invention was made based on the above findings.

An abnormality detection method in an embodiment of the present invention is an abnormality detection method for a vehicle body tilt control device provided on a vehicle having a vehicle body, a pair of bogies located toward a front and a rear of the vehicle body and a pair of air springs located to a left and right of each bogie and supporting the vehicle body, the vehicle body tilt control device controlling supply/exhaust to/from the air springs to tilt the vehicle body. The abnormality detection method includes the steps of; preparing a state estimation model for each of the bogies; and using the state estimation model to detect which one of the air springs has an air supply/exhaust abnormality. The state estimation model is a mathematical model that, when a first flow rate command value indicating a flow rate of air supplied to/exhausted from one air spring is input, multiplies the first flow rate command value by a first virtual gain that is a state variable, when a second flow rate command value indicating a flow rate of air supplied to/exhausted from the other air spring is input, multiplies the second flow rate command value by a second virtual gain that is a state variable, and outputs an average of heights of the air springs based on an average of the first flow rate command value multiplied by the first virtual gain and the second flow rate command value multiplied by the second virtual gain. The step of detecting an abnormality includes the steps of; estimating a value of the first virtual gain and a value of the second virtual gain by using, as a value output by the state estimation model, an average of a value obtained by observing a height of the one air spring when supply/exhaust is controlled based on the first flow rate command value and a value obtained by observing a height of the other air spring when supply/exhaust is controlled based on the second flow rate command value; and determining that there is an abnormality in the supply/exhaust for the one air spring when the estimated value of the first virtual gain is below a predetermined threshold and determining that there is an abnormality in the supply/exhaust for the other air spring when the estimated value of the second virtual gain is below the predetermined threshold.

According to the above abnormality detection method, the value of the virtual gain by which the flow rate command value of the supply/exhaust to/from each air spring is multiplied is estimated, and, if there is a virtual gain whose estimated value is below a predetermined threshold, it is determined that there is an abnormality in the supply/exhaust for the air spring corresponding to that virtual gain. That is, if the estimated value of one virtual gain is below a predetermined threshold, it can be determined that the flow rate command value of the supply/exhaust multiplied by that virtual gain contributes little to the control of the height of the air spring and thus there is an abnormality in the supply/exhaust for the air spring corresponding to that virtual gain.

Thus, the above abnormality detection method can detect which one of the air springs has an air supply/exhaust abnormality, thereby making it possible to quickly return the tilted vehicle body to its horizontal position and making it easy to repair it.

Preferably, the step of determining determines that there is an abnormality in the supply/exhaust for the one air spring when the estimated value of the first virtual gain has been below the predetermined threshold for a predetermined period of time, and determines that there is an abnormality in the supply/exhaust for the other air spring when the estimated value of the second virtual gain has been below the predetermined threshold for the predetermined period of time.

This implementation prevents erroneous detection of an abnormality in the supply/exhaust for an air spring. This will improve the precision with which it is detected which one of the air springs has an air supply/exhaust abnormality.

Preferably, the vehicle body tilt control device includes: a first flow proportional valve for controlling a flow rate of air supplied to the one air spring and air exhausted from the one air spring; a first supply block valve for switching on or off the supply of air to the one air spring; a first exhaust block valve for switching on or off the exhaust of air from the one air spring; a second flow proportional valve for controlling a flow rate of air supplied to the other air spring and air exhausted from the other air spring; a second supply block valve for switching on or off the supply of air to the other air spring; and a second exhaust block valve for switching on or off the exhaust of air from the other air spring. The first flow rate command value includes: a first supply flow rate command value indicating the flow rate of air supplied to the one air spring; and a first exhaust flow rate command value indicating the flow rate of air exhausted from the one air spring. The second flow rate command value includes: a second supply flow rate command value indicating the flow rate of air supplied to the other air spring; and the second exhaust flow rate command value indicating the flow rate of air exhausted from the other air spring. The first virtual gain includes: a first supply virtual gain by which the first supply flow rate command value is multiplied when the first supply flow rate command value is input; and a first exhaust virtual gain by which the first exhaust flow rate command value is multiplied when the first exhaust flow rate command value is input. The second virtual gain includes: a second supply virtual gain by which the second supply flow rate command value is multiplied when the second supply flow rate command value is input; and a second exhaust virtual gain by which the second exhaust flow rate command value is multiplied when the second exhaust flow rate command value is input. The state estimation model outputs the average of the heights of the air springs based on an average of the first supply flow rate command value multiplied by the first supply virtual gain or the first exhaust flow rate command value multiplied by the first exhaust virtual gain and the second supply flow rate command value multiplied by the second supply virtual gain or the second exhaust flow rate command value multiplied by the second exhaust virtual gain. The step of estimating estimates the value of the first supply virtual gain, the value of the first exhaust virtual gain, the value of the second supply virtual gain and the value of the second exhaust virtual gain by using, as the value output by the state estimation model, an average of a value obtained by observing the height of the one air spring when control is done based on the first supply flow rate command value or the first exhaust flow rate command value and a value obtained by observing the height of the other air spring when control is done based on the second supply flow rate command value or the second exhaust flow rate command value. The step of determining determines that there is an abnormality in the first supply block valve when the estimated value of the first supply virtual gain is below the predetermined threshold, determines that there is an abnormality in the first exhaust block valve when the estimated value of the first exhaust virtual gain is below the predetermined threshold, determines that there is an abnormality in the second supply block valve when the estimated value of the second supply virtual gain is below the predetermined threshold, and determines that there is an abnormality in the second exhaust block valve when the estimated value of the second exhaust virtual gain is below the predetermined threshold.

The above implementation not only detects which one of the air springs has an air supply/exhaust abnormality, but also detects whether the abnormality relates to supply or exhaust, or more specifically, which one of the supply-side block valve and the exhaust-side block valve has the abnormality. This makes it possible to still more quickly return the tilted vehicle body to its original position and makes it still easier to repair it.

For example, it is assumed that it is determined that there is an abnormality in the exhaust-side block valve for the air spring located on one vehicle half and above the outer rail. Then, the position at which the spool in the flow proportional valve stops relative to the air spring located on this vehicle half and above the inner rail may be adjusted to adjust the height of the air spring above the inner rail so as to be equal to the height of the air spring located above the outer rail. Typically, a flow proportional valve has a higher flow rate than differential pressure regulating valves or LV valves, making it possible to quickly return the vehicle body to its original position.

Preferably, the step of determining determines that there is an abnormality in the first supply block valve when the estimated value of the first supply virtual gain has been below the predetermined threshold for a predetermined period of time, determines that there is an abnormality in the first exhaust block valve when the estimated value of the first exhaust virtual gain has been below the predetermined threshold for the predetermined period of time, determines that there is an abnormality in the second supply block valve when the estimated value of the second supply virtual gain has been below the predetermined threshold for the predetermined period of time, and determines that there is an abnormality in the second exhaust block valve when the estimated value of the second exhaust virtual gain has been below the predetermined threshold for the predetermined period of time.

This implementation prevents erroneous detection of an abnormality in an air spring. This will improve the precision with which it is detected which one of the air springs has an air supply/exhaust abnormality.

This implementation prevents erroneous detection of an abnormality. This will improve the precision with which it is detected which one of the supply-side block valve and exhaust-side block valve has an abnormality.

EMBODIMENTS FOR CARRYING OUT THE INVENTION

An abnormality detection method for a vehicle body tilt control device in an embodiment of the present invention will be described with reference to the accompanied drawings.

Figure 1A:
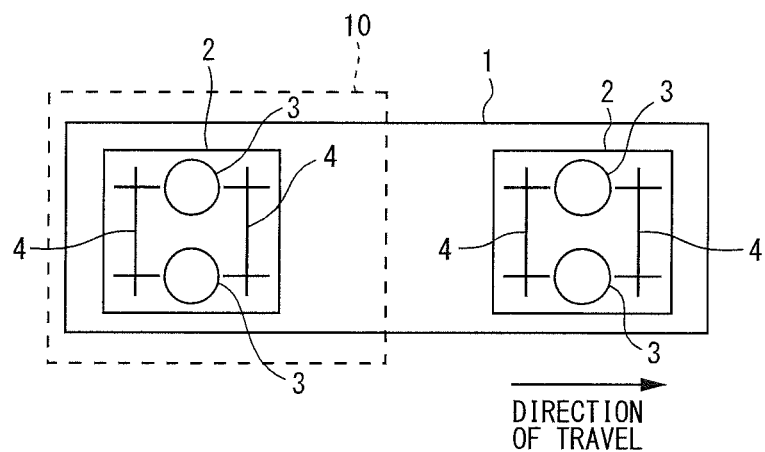
FIG. 1A is a schematic view of a vehicle.
Figure 1B:
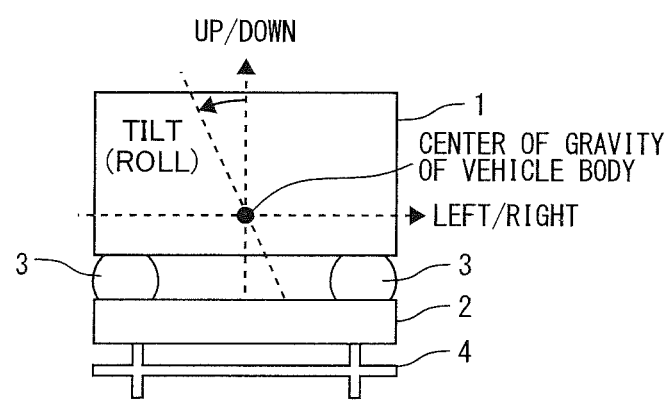
FIG. 1B schematically illustrates the relationship between a bogie and the vehicle body.
Figure 2A:
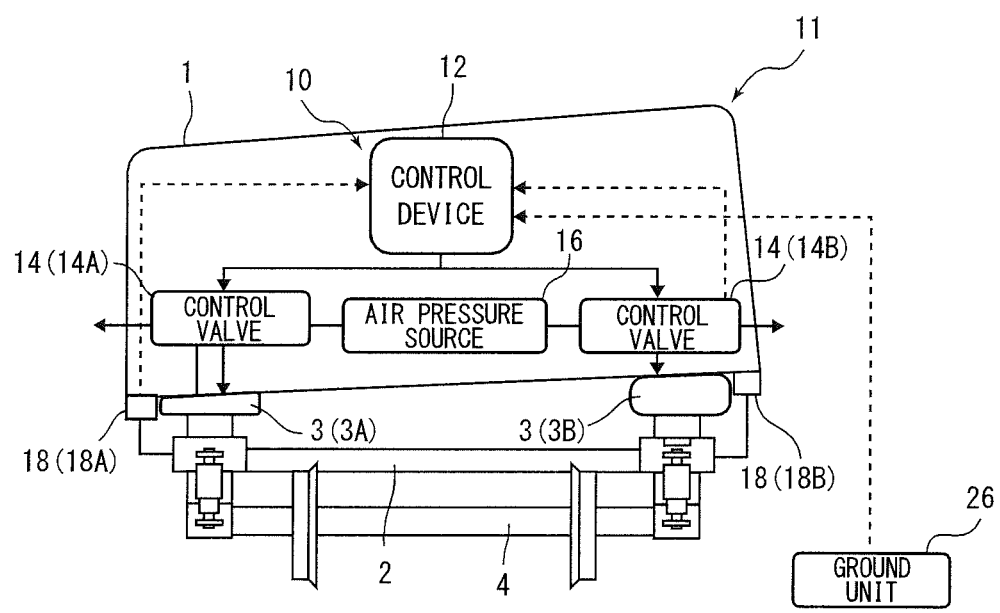
FIG. 2A is a schematic view of a vehicle body tilt control device.
Figure 2B:
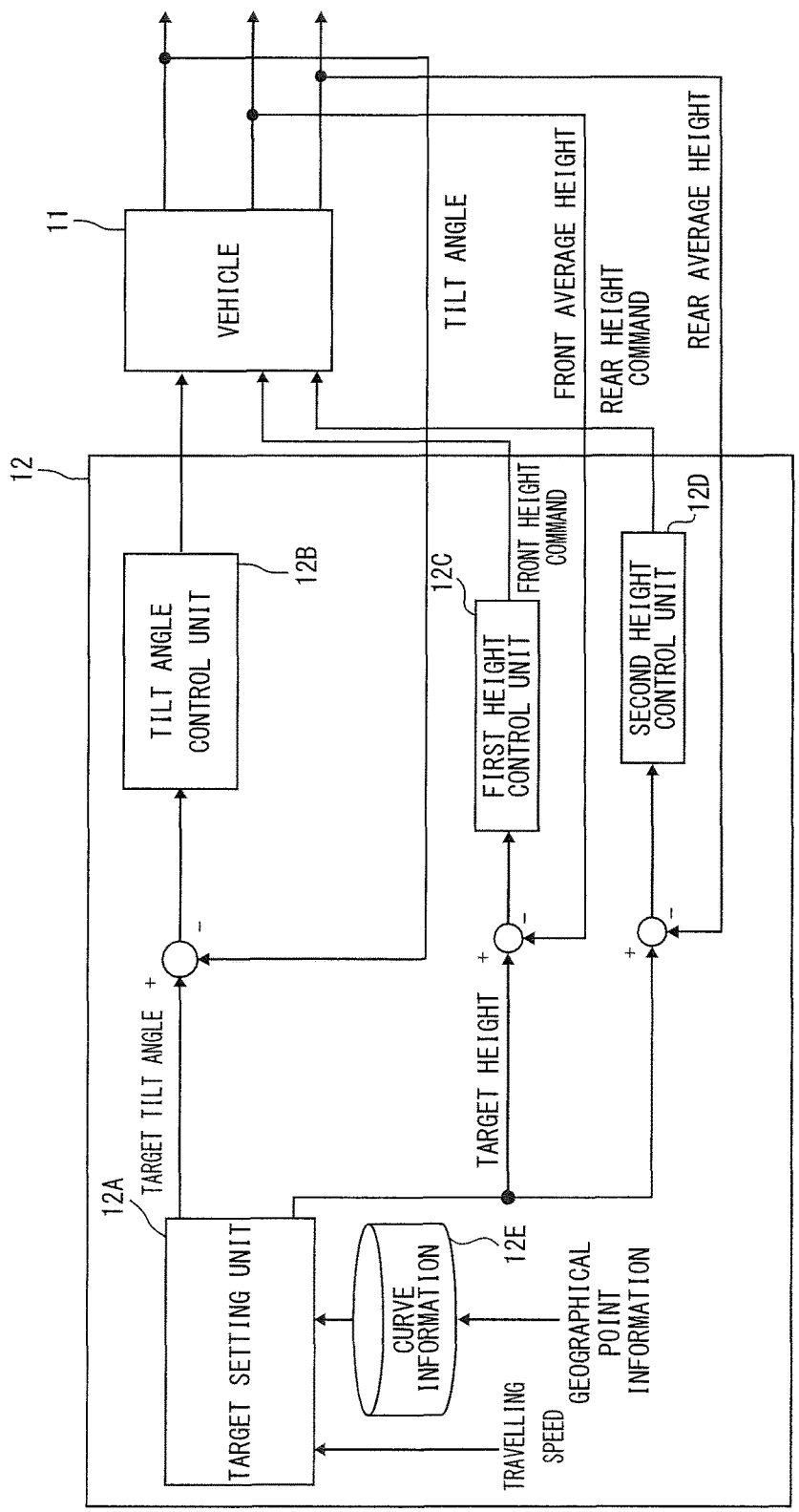
FIG. 2B is a block diagram schematically illustrating the control device included in the vehicle body tilt control device.
Figure 3:
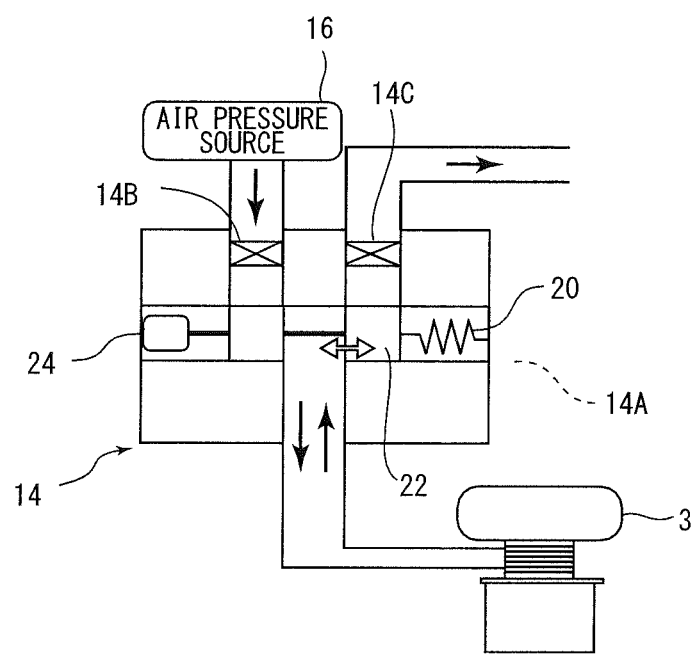
FIG. 3 is a schematic view of a control valve included in the vehicle body tilt control device.
Figure 4:
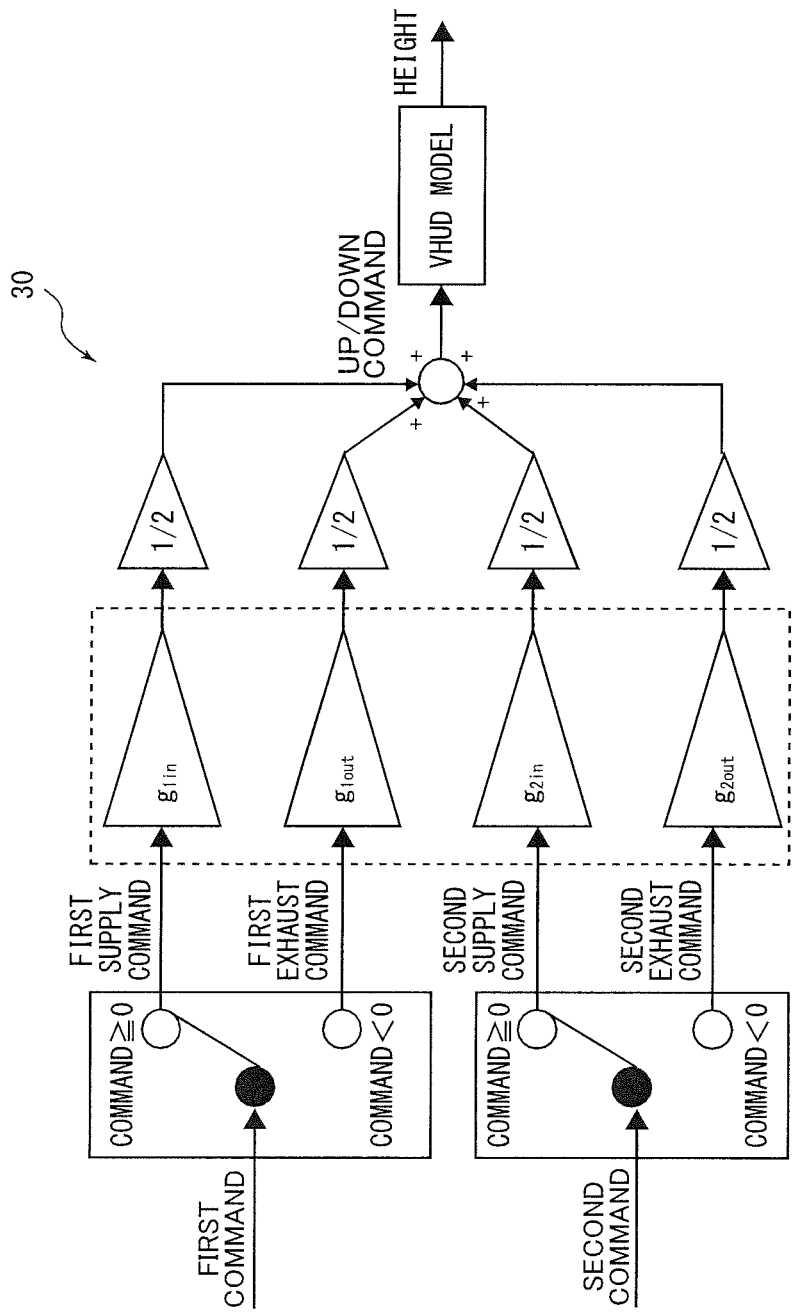
FIG. 4 schematically illustrates a state estimation model.

FIG. 1A is a schematic view of a vehicle. FIG. 1B shows the relationship between a bogie and the vehicle body. FIG. 2A schematically illustrates the vehicle body tilt control device in the embodiment of the present invention. FIG. 2B is a block diagram of an arrangement for tilt control for the vehicle body by the vehicle body tilt control device. FIG. 3 schematically shows a control valve included in the vehicle body tilt control device. FIG. 4 schematically illustrates a state estimation model.

As shown in FIG. 2A, vehicle body tilt control devices 10 are provided on a vehicle 11. As shown in FIG. 1A, the vehicle 11 includes a vehicle body 1, a pair of bogies 2, and a pair of air springs 3 for each bogie. The bogies 2 are located on the vehicle body 1 toward the front and rear thereof. A pair of air springs 3 are located on each bogie 2 toward the left and right thereof for supporting the vehicle body 1. The associated vehicle body tilt control device 10 controls the supply and exhaust of air to and from each air spring 3 to tilt the vehicle body 1. A pair of axles 4 are positioned on each bogie 2 toward the front and rear thereof.

As shown in FIG. 2A, the vehicle body tilt control device 10 includes a control device 12, a pair of control valves 14, an air pressure source (source reservoir) 16, and a pair of sensors 18. The control device 12 controls the operation of the control valves 14. One of the control valves 14 (hereinafter referred to as one control valve 14A) controls the supply/exhaust of air to/from one of the air springs 3 (hereinafter referred to as one air spring 3A). The other one of the control valves 14 (hereinafter referred to as other control valve 14B) controls the supply/exhaust of air to/from the other one of the air springs 3 (hereinafter referred to as other air spring 3B). One of the sensors 18 (hereinafter referred to as one sensor 18A) measures the height of the one air spring 3A. The other one of the sensors 18 (hereinafter referred to as other sensor 18B) measures the height of the other air spring 3B. As used herein, height of the air spring 3 means the distance between the top surface of the bogie 2 and the bottom surface of the vehicle body 1, for example.

Each sensor 18 may be implemented by an encoder and a link mechanism, for example.

As shown in FIG. 3, each control valve 14 includes a flow proportional valve 14A, a supply-side block valve 14B and an exhaust-side block valve 14C. The flow proportional valve 14A includes a biasing spring 20, a spool 22 and a motor 24. When driving power from the motor 24 is transmitted to the spool 22, the spool 22 moves, resisting the biasing force of the biasing spring 20. The flow proportional valve 14A changes the position at which the spool 22 stops to control the flow rate for the supply of air to the air spring 3 and the flow rate for the exhaust of air therefrom. The supply-side block valve 14B controls the supply of air to the flow proportional valve 14A. The exhaust-side block valve 14C controls the exhaust of air from the flow proportional valve 14A. Each of the supply-side block valve 14B and exhaust-side block valve 14C is an electromagnetic valve and is either in an open position or in a closed position. When air is to be supplied to the air spring 3, the motor 24 causes the spool 22 to move to the left on paper in FIG. 3. When air is to be exhausted from the air spring 22, the spool 3 moves to the right. The motor 24 moves continuously based on supply/exhaust commands. This makes it possible to control the supply/exhaust to/from the air spring 3 with high precision.

Referring to FIG. 2B, the control device 12 includes a target setting unit 12A, a tilt angle control unit 12B, a first height control unit 12C, a second height control unit 12D, and a data base 12E.

The target setting unit 12A sets a target value of the tilt angle of the vehicle body 1 relative to the bogie 2 and a target value of the height of the vehicle body 1 from the bogie 2. To do this, the target setting unit 12A refers to curve information corresponding to geographical point information that the vehicle 11 acquires from a ground unit 26 (see FIG. 2A). The curve information is stored in the data base 12E.

The tilt angle control unit 12B controls the heights of a pair of air springs 3 such that the tilt angle of the vehicle body 1 relative to the associated bogie 1 is equal to the target tilt angle. The tilt angle of the vehicle body 1 relative to the bogie 2 is acquired from sensors (not shown) provided on the vehicle 11.

In order that the height of the vehicle body 1 from the bogie 2 located toward the front with respect to the direction of travel of the vehicle 11 (hereinafter referred to as bogie 2A) is equal to the target height, the first height control unit 12C controls the heights of the associated pair of air springs 3. The height of the vehicle body 1 from the bogie 2A is the average of heights obtained by the associated pair of sensors 18.

In order that the height of the vehicle body 1 from the bogie 2 located toward the rear with respect to the direction of travel of the vehicle 11 (hereinafter referred to as bogie 2B) is equal to the target height, the second height control unit 12D controls the heights of the associated pair of air springs 3. The height of the vehicle body 1 from the bogie 2B is the average of heights obtained by the associated pair of sensors 18.

The present inventors did extensive research to provide an abnormality detection method that can detect which one of the four air springs 3 included in the vehicle 11 has an air supply/exhaust abnormality. They turned their attention to an approach that includes creating a vehicle body tilt movement model that models vehicle body tilt movements, expressing an abnormality in supply/exhaust for each air spring 3 for which detection is to be done as a virtual gain, adding this virtual gain, as a state variable, to the vehicle body tilt movement model, and considering the resulting state estimation model. Then, they found out that applying a state estimation technique such as an extended Kalman filter to this state estimation model and estimating the virtual gain would make it possible to determine that there is an abnormality in the supply/exhaust for that air spring 3 that corresponds to the virtual gain whose estimated value is below a predetermined threshold.

When there is an abnormality in the supply/exhaust for an air spring 3, the height of the vehicle body 1 relative to the bogie 2 can be affected more easily than the tilt of the vehicle body 1 relative to the bogie 2 shown in FIG. 1B, because the tilt of the vehicle body 1 relative to the bogie 2 is affected by torsional moment on the vehicle body 1. Further, as two bogies 2 are provided on the front and rear of the vehicle body 1, the control of the height of the vehicle body 1 relative to one bogie 2 is independent from that relative to the other bogie 2, and supply/exhaust commands for the air springs 3 are provided on a bogie 2 basis. In view of this, the present inventors found it advantageous if the vehicle body tilt movement model used to detect an abnormality in the supply/exhaust for each air spring 3 is a model in which, for each of the front and rear vehicle halves 10 into which the vehicle 1 is divided (or for each bogie 2), the average of the flow rate command values of supply/exhaust to/from the air springs 3 located on the bogies 2 (i.e. up/down commands for the vehicle 1) is input and the average of the heights of the air springs 3 (i.e. the heights of the vehicle body 1 from the bogie 2) is output (i.e. vehicle-half, up/down model, or VHUD model), as shown in FIG. 4. A VHUD model can be obtained by extracting the components relating to the up/down movements of the vehicle body 1 from a linear equation of motion for the vehicle body 1, the bogie 2 and the air springs 3 located between the vehicle body 1 and bogie 2. Then, the present inventors found out that, if the flow rate command values of supply/exhaust to/from the air springs 3 in this VHUD model are multiplied by a virtual gain and the average of the flow rate command values of supply/exhaust to/from the air springs 3 after the multiplication by the virtual gain is input to the VHUD model, then, when the estimated value of one virtual gain is below a predetermined threshold, it can be determined that the flow rate command value of supply/exhaust multiplied by this virtual gain does not contribute much to the input to the VHUD model, that is, there is an abnormality in the supply/exhaust for the air spring 3 corresponding to that virtual gain.

Figure 5A:
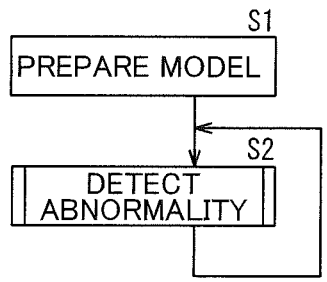
FIG. 5A is a flow chart illustrating the abnormality detection method for the vehicle tilt control device in an embodiment of the present invention.

In view of the above findings, the abnormality detection method in the present embodiment includes a model creation step (step S1) for preparing a state estimation model for each of the front and rear vehicle halves 10 into which a vehicle is divided, as shown in FIG. 5A, and an abnormality detection step (step S2) for applying a state estimation technique to the state estimation model to detect which one of the air springs 3 has an air supply/exhaust abnormality. The steps will be described below one by one.

<Model Creation Step>

Referring to FIG. 4, the state estimation model 30 prepared in the model preparation step is a mathematical model where, when a flow rate command value of supply/exhaust to/from each of the air springs 3 included in each vehicle half 10 is input, the input flow rate command value of supply/exhaust to/from the air spring 3 is multiplied by a virtual gain and the results are averaged, and this average (i.e. up/down command for the vehicle body 1) is input to the VHUD model to output the average of the heights of the air springs 3 (i.e. height of the vehicle body 1 from the bogie 2) The state estimation model 30 includes each virtual gain is included as a state variable.

More specifically, when a flow rate command value of supply of air to one of the air springs 3 included in a vehicle half 10 (i.e. first supply command) is input, the state estimation model 30 multiplies this flow rate command value of air supply by a first supply virtual gain (i.e. first supply command virtual gain) $g_{un}$. When a flow rate command value of exhaust of air from one of the air springs 3 included in the vehicle half 10 (i.e. first exhaust command) is input, the model multiplies this flow rate command value of air exhaust by a first exhaust virtual gain (i.e. first exhaust command virtual gain) $g_{1out}$. When a flow rate command value of supply of air to the other one of the air springs 3 included in the vehicle half 10 (i.e. second supply command) is input, the model multiplies this flow rate command value of air supply by a second supply virtual gain (i.e. second supply command virtual gain) $g2_{in}$. When a flow rate command value of exhaust of air from the other one of the air springs 3 included in the vehicle half 10 (i.e. second exhaust command) is input, the model multiplies this flow rate command value of air exhaust by a second exhaust virtual gain (i.e. second exhaust command virtual gain) $g2_{out}$. The model averages the flow rate command value multiplied by the first supply virtual gain $g_{1in}$ or the flow rate command value multiplied by the first exhaust virtual gain $p_{1out}$ and the flow rate command value multiplied by the second supply virtual gain $g_{2in}$ or the flow rate command value multiplied by the second exhaust virtual gain $g_{2out}$. Based on the averages (i.e. up/down commands for the vehicle body 1), the average of the heights of the one and other air springs 3 (i.e. height of the vehicle body 1 from the bogie 2) is output. The first supply virtual gain $g_{1in}$, first exhaust virtual gain $g_{1out}$, second supply virtual gain $g_{2in}$, and second exhaust virtual gain $g_{2out}$ are included as state variables.

The state estimation model 30 is expressed by the following state equation.

$$X = AX + BU \quad \text{[Formula 1]}$$

$$Y = CX$$

Here, A, B, C, X and U are defined as follows.

$$A = \begin{pmatrix} 0 & 1 & 0 & 0 & 0 & 0 & 0 & 0 \\ a_{21} & 0 & a_{23} & a_{24} & 0 & 0 & 0 & 0 \\ a_{31} & 0 & a_{33} & a_{34} & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{pmatrix} \quad \text{[Formula 2]}$$

$$B = \begin{pmatrix} 0 & 0 & 0 & 0 \\ 0 & 0 & 0 & 0 \\ 0 & 0 & 0 & 0 \\ \frac{b_{41} \cdot kV \cdot x_5}{2} & \frac{b_{41} \cdot kV \cdot x_6}{2} & \frac{b_{41} \cdot kV \cdot x_7}{2} & \frac{b_{41} \cdot kV \cdot x_8}{2} \\ 0 & 0 & 0 & 0 \\ 0 & 0 & 0 & 0 \\ 0 & 0 & 0 & 0 \\ 0 & 0 & 0 & 0 \end{pmatrix} \quad \text{[Formula 3]}$$

$$C = (1\ 0\ 0\ 0\ 0\ 0\ 0\ 0) \quad \text{[Formula 4]}$$

$$X = \begin{pmatrix} x_1 \\ x_2 \\ x_3 \\ x_4 \\ x_5 \\ x_6 \\ x_7 \\ x_8 \end{pmatrix} = \begin{pmatrix} \text{height} \\ \text{velocity} \\ \text{first air spring variable} \\ \text{second air spring variable} \\ \text{virtual gain } (g_{1in}) \\ \text{virtual gain } (g_{1out}) \\ \text{virtual gain } (g_{2in}) \\ \text{virtual gain } (g_{2out}) \end{pmatrix} \quad \text{[Formula 5]}$$

$$U = \begin{pmatrix} u_{1in} \\ u_{1out} \\ u_{2in} \\ u_{2out} \end{pmatrix} = \begin{pmatrix} \text{first supply command} \\ \text{first exhaust command} \\ \text{second supply command} \\ \text{second exhaust command} \end{pmatrix} \quad \text{[Formula 6]}$$

Here, $a_{21}$, $a_{23}$, $a_{24}$, $a_{31}$, $a_{32}$ and $a_{33}$ included in A are defined as follows.

$$a_{21} = \frac{-2(k_2 + k_3) - k_4}{m} \quad \text{[Formula 7]}$$

$$a_{23} = a_{24} = \frac{k_2}{m} \quad \text{[Formula 8]}$$

$$a_{31} = \frac{2 \cdot k_2}{c_2} \quad \text{[Formula 9]}$$

$$a_{33} = \frac{-k_2(1 + N)}{c_2} \quad \text{[Formula 10]}$$

$$a_{34} = -\frac{k_2}{c_2} \quad \text{[Formula 11]}$$

Here, $k_2$ is the stiffness of the body of an air spring as measured in the up/down direction. $k_3$ is the stiffness of the air spring against the rate of change in pressure-receiving area. $c_2$ is a damping coefficient of the air spring. $A_0$ is an effective pressure-receiving area of the air spring. $\rho$ is the density of air in the air pressure source. m is the weight of a vehicle body half. N is the volume ratio of an auxiliary air chamber in the body of the air spring. kV is a conversion factor obtained by dividing a supply/exhaust flow rate by a voltage.

The first supply command ($u_{1in}$), first exhaust command ($u_{1out}$), second supply command ($u_{2in}$) and second exhaust command ($u_{2out}$) constituting the input vector U are defined as follows.

$$u_{1in} = \begin{cases} u_1, & \text{if } u_1 \geq 0 \\ 0, & \text{otherwise} \end{cases} \quad \text{[Formula 12]}$$

$$u_{1out} = \begin{cases} 0, & \text{if } u_1 \geq 0 \\ 0, & \text{otherwise} \end{cases} \quad \text{[Formula 13]}$$

$$u_{2in} = \begin{cases} u_2, & \text{if } u_2 \geq 0 \\ 0, & \text{otherwise} \end{cases} \quad \text{[Formula 14]}$$

$$u_{2out} = \begin{cases} 0, & \text{if } u_2 \geq 0 \\ u_2, & \text{otherwise} \end{cases} \quad \text{[Formula 15]}$$

Figure 6:
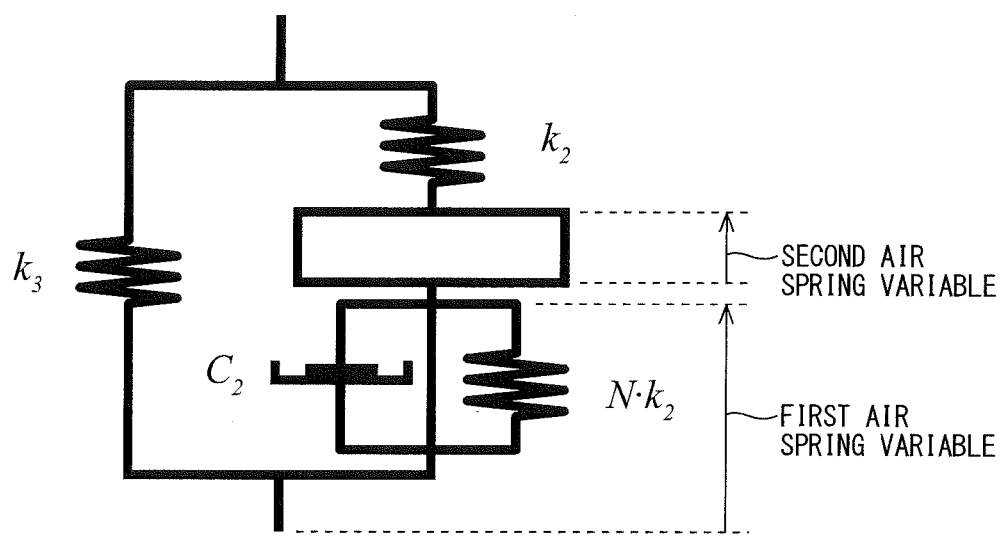
FIG. 6 shows a model of an air spring.

The state variable vector X includes, in addition to the four virtual gains $g_{1in}$, $g_{1out}$, $g_{2in}$, and $g_{2out}$, the height ($x_1$), velocity ($x_2$), first air spring variable ($x_3$) and second air spring variable ($x_4$). The height ($x_1$) is the height of the vehicle body from the bogie. The velocity ($x_2$) is the velocity of the vehicle body as measured in the up/down direction. The first air spring variable ($x_3$) is the variable for the portion of the air spring that is indicated in FIG. 6. The second air spring variable ($x_4$) is the variable for the portion of the air spring that is indicated in FIG. 6.

<Abnormality Detection Step>

The abnormality detection step is performed at a predetermined time interval. The abnormality detection step applies a state estimation technique using the average of the heights of the air springs 3 obtained by observation depending on the flow rate command values of supply/exhaust to/from the air springs 3 input to the state estimation model 30 to estimate the values of the virtual gains which are state variables. If there is a virtual gain whose estimated value is below a predetermined threshold, it is determined that there is an abnormality in the supply/exhaust for the air spring 3 corresponding to this virtual gain.

More specifically, in the abnormality detection step, state variables including the values of the first supply virtual gain $g_{1in}$, first exhaust virtual gain $g_{1out}$, second supply virtual gain $g_{2in}$ and second exhaust virtual gain $g_{2out}$ are estimated by applying a state estimation technique using the averages of the heights of the one and other air springs 3 (i.e. heights of the vehicle body 1 from the bogie 2) obtained by observation depending on the flow rate command values of supply or exhaust of air to/from one and other air springs 3 input to the state estimation model 30 (i.e. first supply command, first exhaust command, second supply command and second exhaust command). If there is a virtual gain whose estimated value is below a predetermined threshold, it is determined that there is an abnormality in the supply-side block valve or exhaust-side block valve (see FIG. 3) for the air spring 3 corresponding to this virtual gain.

As discussed above, the state variable vector X of the state equation that represents the state estimation model 30 includes the virtual gains $g_{1in}$, $g_{1out}$, $g_{2in}$ and $g_{2out}$ as state variables ($X_5 = g_{1in}$, $x_6 = g_{1out}$, $X_7 = g_{2in}$ and $x_8 = g_{2out}$). Further, it can be recognized that the observation vector Y is the height $x_1$. Further, it can be recognized that the input vector U is constituted by the first supply command, first exhaust command, second supply command and second exhaust command. As discussed above, the state equation representing the state estimation model 30 is a non-linear state equation in which the coefficient vector B of the input vector U includes the state variables x5 to x8, and thus an extended Kalman filter that can accommodate a non-linear state equation may be applied to estimate the virtual gains.

Figure 5B:
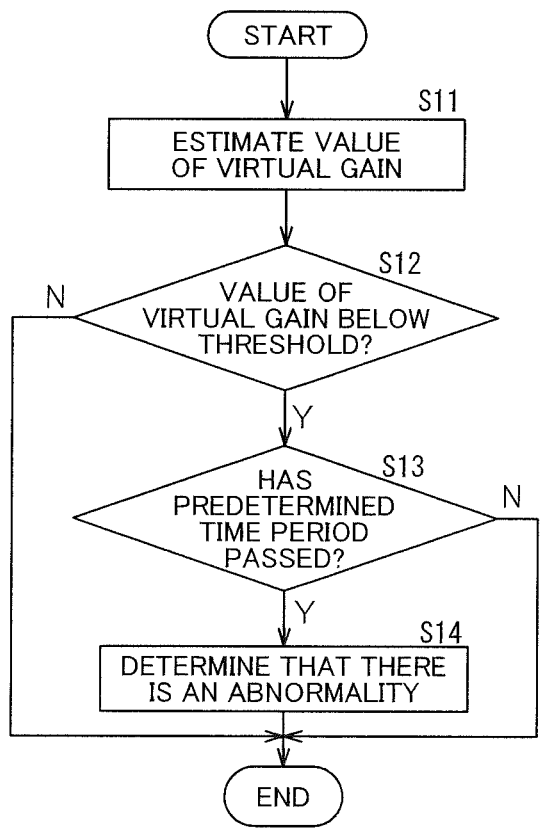
FIG. 5B is a flow chart illustrating the step of detecting an abnormality, included in the abnormality detection method for the vehicle tilt control device in the embodiment of the present invention.

The abnormality detection step will be described in more detail with reference to FIG. 5B.

First, at step S11, the control device 12 acquires an observation value of the height of one air spring 3A and an observation value of the height of the other air spring 3B, and applies an extended Kalman filter using the average of these observation values to estimate the values of the virtual gains. When the extended Kalman filter is applied, an equation obtained by discretize the state space representation by the above state equation and its Jacobian are used. These equations are as follows.

$$X_{t+1} = f(X_t) = \begin{pmatrix} x_{1t} + \Delta x_{2t} \\ x_{2t} + \Delta(a_{21}x_{1t} + a_{23}x_{3t} + a_{24}x_{4t}) \\ x_{3t} + \Delta(a_{31}x_{1t} + a_{33}x_{3t} + a_{34}x_{4t}) \\ x_{4t} + \frac{\Delta b_{41}(x_{5t}u_{1int} + x_{6t}u_{1outt} + x_{7t}u_{2int} + x_{8t}u_{2outt})}{2} \\ x_{5t} \\ x_{6t} \\ x_{7t} \\ x_{8t} \end{pmatrix}$$

[Formula 16]

$$Y_t = h(X_t) = x_{1t}$$

[Formula 17]

$$F = \frac{\partial h}{\partial X} = \begin{pmatrix} 1 & 0 & 0 & 0 & 0 & 0 & 0 & 0 \\ \Delta a_{21} & 1 & \Delta a_{23} & \Delta a_{24} & 0 & 0 & 0 & 0 \\ \Delta a_{31} & 0 & 1+\Delta a_{33} & \Delta a_{34} & 0 & 0 & 0 & 0 \\ 0 & 0 & 0 & 1 & \frac{\Delta b_{41} \cdot kV \cdot u_{1int}}{2} & \frac{\Delta b_{41} \cdot kV \cdot u_{1out}}{2} & \frac{\Delta b_{41} \cdot kV \cdot u_{2int}}{2} & \frac{\Delta b_{41} \cdot kV \cdot u_{2out}}{2} \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{pmatrix}$$

[Formula 18]

$$H = \frac{\partial h}{\partial X} = (1 \; 0 \; 0 \; 0 \; 0 \; 0 \; 0 \; 0)$$

[Formula 19]

The algorithm of the extended Kalman filter calculates, at a predetermined time interval, (1) the observation-obatined Jacobian, (2) extended Kalman gain, (3) state estimate, (4) estimated state error covariance matrix, (5) state estimate at the preceding interval, (6) state transition Jacobian, and (7) predicted error covariance matrix. To calculate (3) the state estimate (i.e. state variable vector X), the average of the above observation values is used.

Next, at step S12, the control device 12 determines whether there is a virtual gain having a value that is below a predetermined threshold. The threshold may be 0.5, for example.

If there is no virtual gain having a value below the predetermined threshold (NO at step S12), the control device 12 ends the abnormality detection step. If there is a virtual gain having a value below the predetermined threshold (YES at step S12), then, at step S13, the control device 12 determines whether this virtual gain has been continuously having a value below the predetermined threshold for a predetermined time period. The predetermined time period may be 3 seconds, for example.

If the virtual gain has not been so continuously for the predetermined time period (NO at step S13), the control device 12 ends the abnormality detection step. If the virtual gain has been so continuously for the predetermined time period (YES at step S13), then, at step S14, the control device 12 identifies the virtual gain that has been continuously having a value below the threshold for the predetermined time period and determines that there is an abnormality in the block valve corresponding to this virtual gain. Thereafter, the control device 12 ends the abnormality detection step.

According to the abnormality detection method in the present embodiment described above, the values of the virtual gains by which the flow rate command values of the supply/exhaust to/from the air springs 3 are multiplied are estimated, and, if there is a virtual gain whose estimated value is below a predetermined threshold, it is determined that there is an abnormality in the supply/exhaust for the air spring 3 corresponding to that virtual gain. That is, if the estimated value of one virtual gain is below a predetermined threshold, it can be determined that the flow rate command value of the supply/exhaust multiplied by that virtual gain contributes little to the control of the height of the air spring 3 and thus there is an abnormality in the supply/exhaust in the air spring 3 corresponding to that virtual gain.

Thus, the abnormality detection method in the present embodiment can detect which one of the air springs 3 has an air supply/exhaust abnormality, thereby making it possible to quickly return the tilted vehicle body 1 to its horizontal position and making it easy to repair it.

Particularly, the present embodiment not only detects which one of the air springs 3 has an air supply/exhaust abnormality, but also detects whether the abnormality relates to supply or exhaust, or more specifically, which one of the supply-side block valve and the exhaust-side block valve has the abnormality. This makes it possible to still more quickly remove the tilt of the vehicle body 1 and makes it still easier to repair it.

Figure 7A:
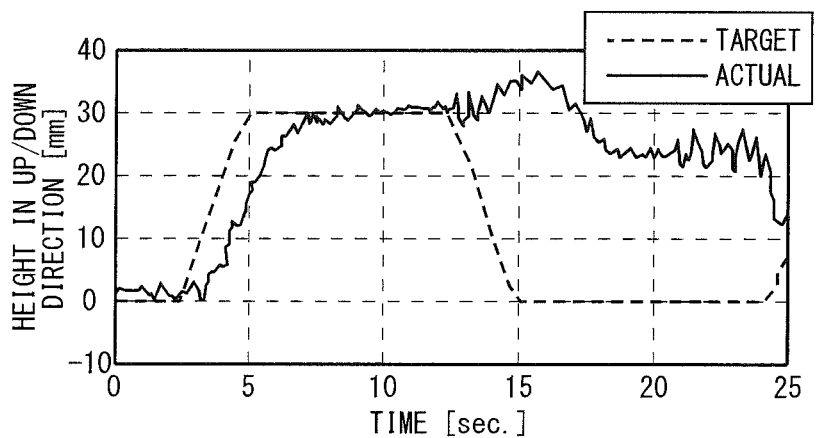
FIG. 7A is a graph showing an example result of a simulation of abnormality detection by the abnormality detection method for the vehicle body tilt control device in the embodiment of the present invention, showing how the height of the vehicle body from the bogie changes.
Figure 7B:
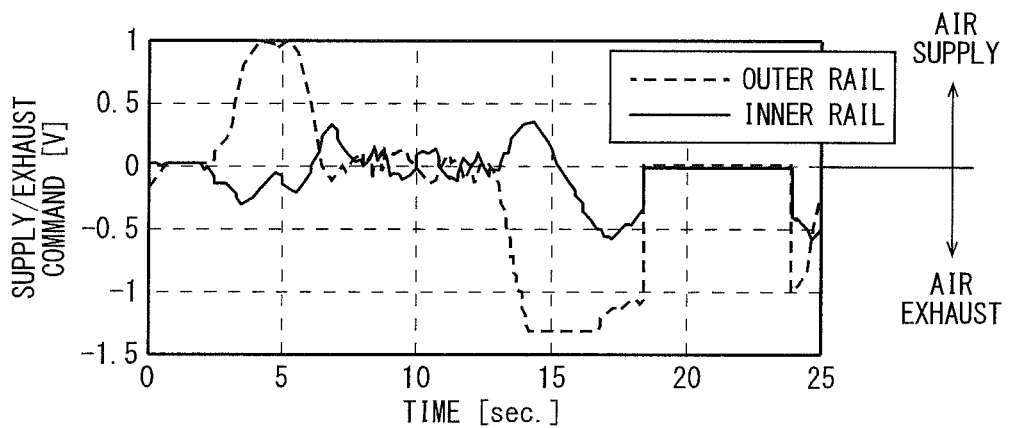
FIG. 7B is a graph showing an example result of a simulation of abnormality detection by the abnormality detection method for the vehicle body tilt control device in the embodiment of the present invention, showing how the flow rate command value changes.
Figure 7C:
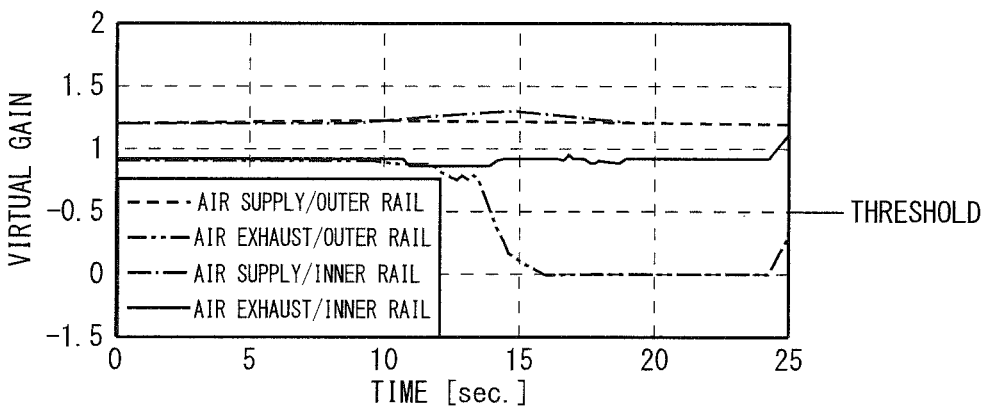
FIG. 7C is a graph showing an example result of a simulation of abnormality detection by the abnormality detection method for the vehicle body tilt control device in the embodiment of the present invention, showing how the virtual gain changes.

FIGS. 7A, 7B and 7C show example results of simulations of abnormality detection by the abnormality detection method for the vehicle body tilt control device in the present embodiment.

The conditions for the simulations were as follows.
(1) Travelling speed: 100 [km/h]
(2) Radius of curve: 400 [m]
(3) Length of transition curve: 80 [m]
(4) Cant height: 105 [mm]
(5) Target tilt angle: 2 [deg.]
(6) Assumed abnormality: the exhaust-side block valve for the air spring above the outer rail remaining closed When, in order to determine the height of the vehicle body from the bogie that was set to allow the vehicle to travel stably under the above conditions (shown by the graph of broken line denoted by "TARGET" in FIG. 7A), the supply/exhaust commands shown in FIG. 7B (i.e. first supply command, first exhaust command, second supply command and second exhaust command) are provided, then, it was found out that the values of the height of the vehicle shown by the graph of the solid line denoted by "ACTUAL" in FIG. 7A are obtained by observation. Applying an extended Kalman filter using the observation values of the height of the vehicle body from the bogie to estimate the virtual gains produced the results shown in FIG. 7C. For example, when the threshold was 0.5, the exhaust virtual gain corresponding to the air spring above the outer rail was below this threshold, showing that it can be determined that the exhaust-side block valve for the air spring above the outer rail had an abnormality.

Although an embodiment of the present invention has been described in detail, this embodiment is merely an example. The present invention is not limited in any way to the above embodiment.

For example, the above embodiment describes an implementation where the block valve for air exhaust remaining closed is detected as an abnormality. However, the present invention can be applied to implementations where the block valve for air supply remaining closed is detected as an abnormality.

The invention claimed is:

1. An abnormality detection method for a vehicle body tilt control device provided on a vehicle having a vehicle body, the vehicle body tilt control device capable of causing the vehicle body to tilt, the abnormality detection method comprising the steps of:
   preparing a state estimation model for each of a pair of bogies located toward a front and a rear of the vehicle body;
   providing a value obtained by observing a height of one of a pair of air springs located to a left and right of each bogie and supporting the vehicle body when the vehicle body tilt control device has controlled supply/exhaust to/from the one air spring based on a first flow rate command value,
   providing a value obtained by observing a height of the other one of the pair of air springs when the vehicle body tilt control device has controlled supply/exhaust to/from the other air spring based on a second flow rate command value, and
   using the state estimation model to detect which one of the pair of air springs located to a left and right of each bogie has an air supply/exhaust abnormality,
   wherein the state estimation model is a mathematical model that, when the first flow rate command value indicating a flow rate of air supplied to/exhausted from one air spring is input, multiplies the first flow rate command value by a first virtual gain that is a state variable,
   when the second flow rate command value indicating a flow rate of air supplied to/exhausted from the other air spring is input, multiplies the second flow rate command value by a second virtual gain that is a state variable, and
   outputs an average of heights of the air springs based on an average of the first flow rate command value multiplied by the first virtual gain and the second flow rate command value multiplied by the second virtual gain,
   wherein the step of detecting an abnormality uses a control device and includes the steps of:
   estimating a value of the first virtual gain and a value of the second virtual gain by using, as a value output by the state estimation model, an average of the value obtained by observing the height of the one air spring when supply/exhaust is controlled based on the first flow rate command value and the value obtained by observing the height of the other air spring when supply/exhaust is controlled based on the second flow rate command value; and
   determining that there is an abnormality in the supply/exhaust for the one air spring when the estimated value of the first virtual gain is below a predetermined threshold and determining that there is an abnormality in the supply/exhaust for the other air spring when the estimated value of the second virtual gain is below the predetermined threshold.

2. The abnormality detection method according to claim 1, wherein the step of determining determines that there is an abnormality in the supply/exhaust for the one air spring when the estimated value of the first virtual gain has been below the predetermined threshold for a predetermined period of time, and determines that there is an abnormality in the supply/exhaust for the other air spring when the estimated value of the second virtual gain has been below the predetermined threshold for the predetermined period of time.

3. The abnormality detection method according to claim 1, wherein:
the vehicle body tilt control device includes:
a first flow proportional valve for controlling a flow rate of air supplied to the one air spring and air exhausted from the one air spring;
a first supply block valve for switching on or off the supply of air to the one air spring;
a first exhaust block valve for switching on or off the exhaust of air from the one air spring;
a second flow proportional valve for controlling a flow rate of air supplied to the other air spring and air exhausted from the other air spring;
a second supply block valve for switching on or off the supply of air to the other air spring; and
a second exhaust block valve for switching on or off the exhaust of air from the other air spring,
wherein the first flow rate command value includes:
a first supply flow rate command value indicating the flow rate of air supplied to the one air spring; and
a first exhaust flow rate command value indicating the flow rate of air exhausted from the one air spring,
wherein the second flow rate command value includes:
a second supply flow rate command value indicating the flow rate of air supplied to the other air spring; and
the second exhaust flow rate command value indicating the flow rate of air exhausted from the other air spring,
wherein the first virtual gain includes:
a first supply virtual gain by which the first supply flow rate command value is multiplied when the first supply flow rate command value is input; and
a first exhaust virtual gain by which the first exhaust flow rate command value is multiplied when the first exhaust flow rate command value is input,
wherein the second virtual gain includes:
a second supply virtual gain by which the second supply flow rate command value is multiplied when the second supply flow rate command value is input; and
a second exhaust virtual gain by which the second exhaust flow rate command value is multiplied when the second exhaust flow rate command value is input,
wherein the state estimation model outputs the average of the heights of the air springs based on an average of the first supply flow rate command value multiplied by the first supply virtual gain or the first exhaust flow rate command value multiplied by the first exhaust virtual gain and the second supply flow rate command value multiplied by the second supply virtual gain or the second exhaust flow rate command value multiplied by the second exhaust virtual gain,
wherein the step of estimating estimates the value of the first supply virtual gain, the value of the first exhaust virtual gain, the value of the second supply virtual gain and the value of the second exhaust virtual gain by using, as the value output by the state estimation model, an average of a value obtained by observing the height of the one air spring when control is done based on the first supply flow rate command value or the first exhaust flow rate command value and a value obtained by observing the height of the other air spring when control is done based on the second supply flow rate command value or the second exhaust flow rate command value,
wherein the step of determining determines that there is an abnormality in the first supply block valve when the estimated value of the first supply virtual gain is below the predetermined threshold, determines that there is an abnormality in the first exhaust block valve when the estimated value of the first exhaust virtual gain is below the predetermined threshold, determines that there is an abnormality in the second supply block valve when the estimated value of the second supply virtual gain is below the predetermined threshold, and determines that there is an abnormality in the second exhaust block valve when the estimated value of the second exhaust virtual gain is below the predetermined threshold.

4. The abnormality detection method according to claim 3, wherein the step of determining
determines that there is an abnormality in the first supply block valve when the estimated value of the first supply virtual gain has been below the predetermined threshold for a predetermined period of time,
determines that there is an abnormality in the first exhaust block valve when the estimated value of the first exhaust virtual gain has been below the predetermined threshold for the predetermined period of time,
determines that there is an abnormality in the second supply block valve when the estimated value of the second supply virtual gain has been below the predetermined threshold for the predetermined period of time, and
determines that there is an abnormality in the second exhaust block valve when the estimated value of the second exhaust virtual gain has been below the predetermined threshold for the predetermined period of time.

* * * * *